United States Patent Office 3,197,448
Patented July 27, 1965

3,197,448
PROPYLENE-BUTADIENE ELASTOMER
AND PROCESS
Gilbert Gavlin, Lincolnwood, Edward A. Hedman,
Roselle, and Bruce W. Hubbard, Jr., Oak Park, Ill.,
assignors to The Richardson Company, Melrose Park,
Ill., a corporation of Ohio
No Drawing. Filed Nov. 14, 1960, Ser. No. 68,654
3 Claims. (Cl. 260—85.3)

This invention is concerned with the production of new elastomers by subjecting propylene and butadiene mixtures to the action of an "Alfin" catalyst.

Alkali metal-catalyzed polymerization of conjugated, unsaturated diolefins, such as isoprene, butadiene-1,3 and similar compounds, has been known for some time and has become a generally accepted method of producing synthetic rubbers. One of the more common alkali metal catalysts is sodium. Production of synthetic rubbers using a sodium catalyst usually involves periods of a day or longer.

A new type of catalyst, developed by Avery A. Morton, has shown superior ability to catalyze certain polymerization reactions, especially the polymerization of butadiene, within a relatively short time. This new catalyst, identified as the "Alfin" catalyst, has effectively polymerized butadiene in a matter of minutes, producing polymers which have been found to have considerably higher molecular weights than have hereto been attained with the commonly employed sodium or other alkali metal catalyst. The Alfin catalyst has been described in a number of publications, including Morton et al., J. Amer. Chem. Soc. 69, 950 (1947) and Morton, The Alfin Reagent, Advances in Catalysis, volume IX (1957).

It is believed that the unique polymerization induced by the Alfin catalyst is a result of a specific absorption on the surface of the catalyst, whereby the molecules are both concentrated and oriented. Somewhat similar results have been attained, in some instances, by the use of very high pressures which, in effect, serve to concentrate the molecules for polymerization.

The Alfin catalyst is a complex mixture of organo-alkali metal compounds, particularly alkali metal alkenyls and alkoxides, with an alkali metal halide. The presently preferred catalysts comprise sodium derivatives of a secondary alcohol and an aliphatic olefin. A particular catalyst found to be highly effective in polymerizing butadiene comprises a mixture of allylsodium, sodium isopropoxide and sodium chloride. Such a catalyst may be formed by initially reacting amyl chloride with sodium, followed by adding isopropyl alcohol, in small amounts, until a predetermined portion of the amylsodium is converted to sodium isopropoxide. Propylene gas is then passed into the mixture, reacting with the remainder of the amylsodium to form allylsodium. The sodium chloride formed during the reaction is bound up in the resulting insoluble aggregate catalyst.

Other Alfin catalysts have also been developed which may be considered as variations of the foregoing. For example, benzylsodium may be used in place of allylsodium, the final complex being formed by introducing toluene rather than propylene into the intermediate amylsodium-sodium isopropoxide mixture. As an alternate, the intermediate mixture may be first treated with propylene and then with toluene. Further, in addition to isopropyl alcohol, other secondary alcohols, having a methyl group joined to a carbinol carbon may, likewise, be used to initially react with the amylsodium to produce a sodium alkoxide in the intermediate mixture, for example, methyl ethyl carbinol.

The secondary alcohol preferably is one having the following general formula:

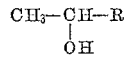

wherein R may be a saturated alkyl group, such as a methyl, ethyl or propyl group. Cyclohexanol, a secondary alcohol, may also be used.

Butadiene polymerization using an Alfin catalyst results in the formation of a predominantly linear chain with no appreciable side chains and a high molecular weight polymer having considerable tensile strength. Approximately seventy-five percent of the butadiene polymerized with an Alfin catalyst has been determined to be of the trans-1,4-isomer variety as distinguished from the normal sodium catalyst type reaction which results, primarily, in a 1,2-isomer polymerization product.

The field of low pressure catalysts, of which the Alfin catalyst is a part, has acquired considerable importance as a result of new polymeric and elastomeric materials which have been developed. However, such catalysts are considered to be limited in their effect on polymerization reactions, in that they are normally specific to only certain monomers. Thus, a particular catalyst cannot be indiscriminately employed to catalyze polymerization reactions, generally, and frequently cannot be used to polymerize selected monomers which are normally considered as being within a generic class.

As indicated above, the Alfin catalyst can be used to polymerize butadiene and, to a lesser extent, isoprene. In the copending application of Hedman et al., Serial No. 796,771, filed March 3, 1959, there has been disclosed and claimed new high molecular weight elastomers resulting from the copolymerization of butadiene or isoprene and butene-2 using an Alfin catalyst. However, somewhat similar monomeric compounds have not been successfully polymerized or copolymerized thus far using the Alfin catalyst. For example, as of the present, neither butene-1 or butene-2 have been homopolymerized in the presence of the Alfin catalyst to produce high molecular weight elastomers of the type contemplated by the above mentioned copending application. According to the disclosure of U.S. Patent 2,606,179, ethylene has been polymerized using an Alfin catalyst and, to a limited extent, also copolymerized with vinylidene monomers; however, as far as is known, ethylene has not been successfully copolymerized with other monomers in the presence of an Alfin catalyst.

With limited exceptions, the Alfin catalyst has not been found to be effective generally in polymerization reactions involving terminal mono olefins as compared to its ability to actively effect polymerization of the somewhat analogous internal olefins, which in some instances may be copolymerizable with butadiene. Illustrative internal olefins which can be thus copolymerized are butene-2 and pentene-2.

It has now been discovered that a new elastomeric copolymer can be formed by subjecting mixtures of propylene and butadiene to the action of an Alfin catalyst. The new copolymer produced is a tough, white-appearing, relatively high molecular weight rubber consisting of a benzene soluble and a benzene insoluble fraction. The benzene soluble fraction is characterized by a dilute solution viscosity (DSV) of between about 5 to 10. Both fractions are characterized by an infra-red absorption peak at 11.95 microns. By contrast, butadiene homopolymer made using an Alfin catalyst generally has a DSV of between approximately 10–20 and fails to exhibit a similar infra-red absorption peak. Minimum average molecular weights of the new copolymer are of the order of 5 to 40 million. The soluble fraction has average minimum molecular weights within the range of about 5–20 million, whereas the insoluble fraction has average minimum molecular weights within the range of about 15–40 million.

For purposes of comparison, a commercially available GR–S (SBR) with an average molecular weight of about 270,000 has a DSV of approximately 2.0, while natural rubber, having an average molecular weight of about three million, has a DSV of between about 5 to 7. To date, the new high molecular weight copolymer described herein has been found to be generally characterized by decreasing solubility in organic solvents with increase in propylene content, which is indicative of a branched structure. These characteristics are frequently preferred in a high impact blending agent for some plastics such as polystyrene wherein the agent is colloidally dispersed rather than dissolved in the plastic.

In further disclosing the basic principles of the invention, and particularly the examples, reference will frequently be made to the presently preferred Alfin catalyst, namely a complex mixture of sodium isopropoxide, allylsodium and sodium chloride. However, it is not intended that the invention is thereby limited to this specific catalyst in view of the fact that the Alfin catalyst may be varied, as indicated hereinabove, to achieve similar results.

The presently preferred Alfin catalyst is formed by initially reacting three moles of sodium with one and one-half moles of amyl chloride. Isopropanol, in predetermined mole quantities, is then reacted with the amylsodium, exemplary isopropanol quantities being 0.75, 0.83 and 1.00 mole. The final step in preparing the catalyst consists of introducing propylene gas, in excess, into the intermediate catalyst complex to form allylsodium with the remaining unreacted amylsodium. The ratio of sodium alkoxide to allylsodium in the presently preferred Alfin catalyst complex used for copolymerization may be varied over a relatively wide range; however, yields and molecular weights will vary, with corresponding variance in properties of the elastomer. In general, an Alfin catalyst derived from an intermediate formed using lower mole quantities of isopropanol, such as 0.75 mole, will result in higher yields of elastomer from the initial monomers, as compared to a catalyst derived from an intermediate formed by using one mole of isopropanol, although elastomers resulting from the first type of catalyst frequently have been found to have lower molecular weights.

When propylene and butadiene are mixed in the presence of an Alfin catalyst, copolymerization begins immediately and, generally, within a matter of minutes a tough, white-appearing elastomer is formed. As indicated, it is believed that the polymerization is due, to a great extent, to the selective adsorption of the monomers on the catalyst surface.

The butadiene and propylene monomers prior to copolymerization are preferably passed through or contacted with purifying agents where possible to remove water, inhibitors and other impurities which may effect the reaction or the catalyst. The normally gaseous monomers are frequently liquified and simultaneously introduced into an inert hydrocarbon solvent, such as pentane, hexane or heptane. In particular, the solvent should be one which does not effect the activity of the catalyst. After forming a solution of the monomers, the Alfin catalyst, in a compatible, inert hydrocarbon suspension, is then added in desired quantities and the reaction begins immediately, with a rise in temperature to a level of about 55° C. or slightly above from the presently preferred minimum starting temperature of about 25° C. As the reaction is customarily conducted in a confined atmosphere, pressures within the reaction vessel will usually rise to the vicinity of about seventy to ninety pounds per square inch. The reaction is completed within a relatively short period, normally less than an hour and usually in about ten minutes, resulting in a swollen, rubbery gel having the solvent entrapped. An alternate and sometimes preferred process comprises adding a solution of the monomers dissolved in an inert hydrocarbon solvent or a mixture of liquid monomers to a suspension of the catalyst in the solvent as a vehicle. This alternate process frequently results in a more homogeneous product and higher yields.

Various weight ratios of propylene to butadiene monomer reactants may be employed. Yields of copolymer can usually be expected to increase with increase in the amount of propylene to butadiene up to a ratio of about 1 to 1 or slightly above. The presence of a large excess of propylene frequently results in a reduction in yield. Increases in the percentage of propylene relative to the butadiene charged into the reaction results in the formation of larger insoluble fractions. An elastomeric product may be made containing from about 1 to 99 percent insoluble fraction by controlling the ratio of propylene to butadiene.

As indicated, the reaction is preferably initiated at about 25° C. If temperatures below this level are used, the reaction rate tends to decline and the quantity of catalyst necessary to achieve the desired reaction increases.

Large quantities of inert hydrocarbon solvent are preferably used to assist in dissipating the heat resulting from the reaction and to moderate the reaction. Thus, in an illustrative example, 25 grams of propylene and 50 grams of butadiene may be added to approximately 450 ml. of purified pentane to form a starting solution.

The solvent contained in the swollen elastomer may be removed by subjecting the mass to warm air, leaving a tough, white-appearing or creamy-colored rubber. If the elastomer is to be compounded with the usual additives employed with natural or other synthetic rubbers, it is preferable to compound the elastomer in the solvent swollen state and then remove the solvent. After compounding the elastomer with oils, fillers, accelerators, sulfur and other common rubber additives, the resulting composition may then be worked on a regular rubber mill. The resulting compounded product may be cured, as by a molding operation, to produce shaped articles having enhanced properties, such as tensile strength and impact resistance, not heretofore obtainable with currently available elastomers. These new elastomers, in general, have been found to require less sulfur to cure to a desired vulcanized condition and to, also, have better oxidation stability as compared to analogous elastomeric compositions.

In the examples given below, molecular weights will be compared in terms of dilute solution viscosity, abbreviated "DSV," a practice which enables better conception of the relatively large molecular weights which are involved in polymeric compositions, such as are generally contemplated by the present invention. The DSV of a particular composition is determined by the following formula:

$$DSV = \frac{2.303 \log \frac{t}{t_0}}{\text{grams elastomer}/100 \text{ cc. of solution}}$$

wherein $t$ is the flow time of the elastomer in a selected solvent using an Ostwald viscosimeter and $t_0$ is the flow time of the solvent.

In determining DSV of the present composition, i.e. the soluble fraction, samples of the Alfin catalyzed polymer are suspended in 100 ml. of benzene to produce a saturated solution having a concentration of about 0.1–0.2 percent, which is filtered prior to viscosity measurement. Concentrations of the elastomer in the solvent are determined by exaporating aliquot portions of the solution. A DSV determination is normally not considered entirely appropriate as an accurate measurement of molecular weight but rather serves primarily as only a rough indication of molecular weight. If a more exact measurement of molecular weight is desired, it should be determined by other means.

As a more specific example of the process, 1.5 liters of 0.83 Alfin catalyst were added to a solution comprising 8.1 pounds of propylene in 20.25 liters of pentane in a 20 gallon reactor. To this composition was then added 4.90 pounds of butadiene. The temperature of the reaction mass rose from about 25° C. to about 57° within ten minutes and the pressure of the closed reactor rose to slightly above 80 lbs./sq. in. The reaction resulted in the formation of a white, tough, rubbery mass which, after vacuum distillation and correction for catalyst residue, had a weight of 4.95 pounds, representing a yield of about 101% based on the butadiene. The elastomer was found to have a DSV of 7.7. An infra-red spectrum of a film of this material exhibited two characteristic absorption peaks, namely at 5.75 microns and 11.95 microns.

The foregoing Alfin catalyst was drawn from 2850 ml. of catalyst suspension derived from 3.0 gram atoms of sodium and an intermediate based on 0.83 mole of isopropanol.

Using the same procedure with 6.8 pounds of propylene and 5.8 pounds of butadiene, a yield of elastomer was obtained which amounted to 115% based on the butadiene.

An infra-red absorption peak at a wave length of 11.95 microns is reported to be caused by compounds containing a tri-substituted ethylene structure

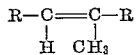

The absorption peak at 5.75 microns appears to be of weak intensity and, accordingly, it is presently believed that this peak will not appear where the incorporated propylene is of the order of about 10% or below.

Infra-red absorbency characteristics are discussed in "Infra-Red Spectra of Complex Molecules," 2nd edition, 1958.

Due to the characteristic strength of the benzene-insoluble portions or fractions of elastomer in all directions, these portions have particular utility in applications such as shock mountings, vibration dampeners, and golf ball covers. Further, the new elastomer, as previously indicated, offers advantages as a blending agent for producing high impact polystyrene. In this respect an elastomer containing a minimum benzene-insoluble portion of about 50% is preferable for such applications; although the associated soluble portion offers advantages as a processing and compounding aid in forming compositions of this type.

We claim:
1. A process for making a high molecular weight elastomeric copolymer which comprises subjecting a mixture of propylene and butadiene in an inert hydrocarbon solvent while in a confined atmosphere to the action of a catalyst complex consisting of sodium chloride, sodium alkenyl derived from an aliphatic olefin and sodium alkoxide derived from a methyl alkyl carbinol, wherein the reaction is initiated at a minimum temperature of about 25° C. and the ratio of propylene to butadiene in said mixture is a maximum of approximately 1:1.

2. A process as described in claim 1 wherein said catalyst complex comprises sodium chloride, sodium allyl and sodium isopropoxide.

3. A process as described in claim 1 wherein the solvent mixture of propylene and butadiene monomers is added to a solvent suspension of the catalyst.

References Cited by the Examiner

UNITED STATES PATENTS

| 2,477,018 | 7/49 | Thomas | 260—85.3 |
| 2,606,179 | 8/52 | Boyd | 260—85.3 |
| 2,841,574 | 7/58 | Foster | 260—94.2 |

FOREIGN PATENTS 776,326  6/57  Great Britain.

OTHER REFERENCES

Gaylord et al.: Linear and Stereoregular Addition Polymers, Interscience Pubilshers, Inc., New York, 1959, pages 113, 135, and 233.

Stewart et al.: Industrial and Engineering Chemistry, vol. 45, No. 1, pp. 173–82.

JOSEPH L. SCHOFER, *Primary Examiner.*
MORRIS LIEBMAN, WILLIAM H. SHORT,
*Examiners.*